US009251661B2

(12) United States Patent
Tammesoo

(10) Patent No.: US 9,251,661 B2
(45) Date of Patent: Feb. 2, 2016

(54) REMOTE LIVE GAME

(75) Inventor: Raul Tammesoo, Tartu (EE)

(73) Assignee: PLAYTECH SOFTWARE LIMITED, Douglas, Isle of Man (GB)

( * ) Notice: Subject to any disclaimer, the term of this patent is extended or adjusted under 35 U.S.C. 154(b) by 664 days.

(21) Appl. No.: 12/522,567

(22) PCT Filed: Jan. 11, 2007

(86) PCT No.: PCT/IB2007/050090

§ 371 (c)(1),
(2), (4) Date: Jul. 9, 2009

(87) PCT Pub. No.: WO2008/084336

PCT Pub. Date: Jul. 17, 2008

(65) Prior Publication Data

US 2010/0102511 A1 Apr. 29, 2010

(51) Int. Cl.
*A63F 13/00* (2014.01)
*G07F 17/32* (2006.01)

(52) U.S. Cl.
CPC ............ *G07F 17/3288* (2013.01); *G07F 17/32* (2013.01); *G07F 17/3293* (2013.01)

(58) Field of Classification Search
CPC .. G07F 17/3288; G07F 17/3293; G07F 17/32
USPC ....................................... 463/11, 40; 273/292
See application file for complete search history.

(56) References Cited

U.S. PATENT DOCUMENTS 4,467,424 A 8/1984 Hedges et al.
5,800,268 A 9/1998 Molnick
6,508,709 B1 * 1/2003 Karmarkar ...................... 463/42
6,638,167 B1 10/2003 Sawyer et al.
6,789,801 B2 * 9/2004 Snow ............................ 273/292
7,285,048 B2 * 10/2007 Karmarkar ...................... 463/42
7,727,060 B2 * 6/2010 Mills ............................... 463/13
8,123,618 B2 * 2/2012 Karmarkar ...................... 463/42
2002/0068635 A1 6/2002 Hill
2003/0109306 A1 * 6/2003 Karmarkar ...................... 463/40
2004/0108656 A1 * 6/2004 Snow ............................ 273/292
2005/0090304 A1 4/2005 Crawford, III et al.

(Continued)

FOREIGN PATENT DOCUMENTS

WO WO 97/14484 4/1997
WO WO 00/40313 7/2000

OTHER PUBLICATIONS

John Grochowski, How to Play Baccarat (Nov. 3, 2006), http://web.archive.org/web/20061103224538/http://entertainment.howstuffworks.com/how-to-play-baccarat1.htm.*

*Primary Examiner* — Milap Shah
*Assistant Examiner* — Thomas H Henry
(74) *Attorney, Agent, or Firm* — Oliff PLC

(57) ABSTRACT

A method and apparatus for enabling a player Io participate in a live online card game. After a card is drawn, and before all players can see it, it is optionally squeezed, i.e. slowly revealed to one or more players, such as the players who placed the highest bet for a particular side. The gradual revealing of the cards is performed by capturing and broadcasting a representative of the particular side showing the cards to a capturing device, by broadcasting pre-recorded image streams, or by broadcasting an image stream generated by a computing platform after a card was scanned by a scanning device. The player can choose the part of the card being revealed, and its orientation.

23 Claims, 3 Drawing Sheets

(56) References Cited

U.S. PATENT DOCUMENTS

| | | | | |
|---|---|---|---|---|
| 2005/0164762 A1* | 7/2005 | Smith et al. | ..................... | 463/16 |
| 2006/0071429 A1* | 4/2006 | Okujyo et al. | ................ | 273/292 |
| 2006/0189384 A1* | 8/2006 | Crawford et al. | ............... | 463/31 |
| 2007/0178955 A1* | 8/2007 | Mills | ............................... | 463/13 |
| 2008/0026807 A1* | 1/2008 | Moshal et al. | .................. | 463/16 |
| 2008/0076506 A1* | 3/2008 | Nguyen et al. | .................. | 463/16 |
| 2008/0108401 A1* | 5/2008 | Baerlocher et al. | ............. | 463/12 |

* cited by examiner

REMOTE LIVE GAME

BACKGROUND OF THE INVENTION

1. Field of the Invention

The present invention relates to a live computer game in general, and to VIP baccarat game in particular.

2. Discussion of the Related Art

Baccarat is a live table card game played in casinos or gaming establishments. The object of the game of baccarat is for a player to successfully wager on whether the "banker" hand, the "player" hand is going to win, or there will be a tie. In order for a hand to win, the hand count, i.e. the sum of the cards in the hand, should be closer to the target count of nine (9) than the other hand. If the hand value exceeds ten, the hand value is determined to be the digit value of the raw hand value. For example, if the raw hand value is 15, the hand value is determined to be 5. The bettor wins even money if he selects the winning hand; wins nine times the wager if he selects tie which indeed occurs; gets his money back if he bet on banker or on player and the result is a tie (a "push" situation); and loses the wager if he bet on tie and the result is player or banker, or if he bet on player or on banker and the other one was closer to nine. Due to the rules of baccarat, and particularly the pre-established card drawing rules, the "banker" hand has slightly higher chances of winning than does the "player" hand. Therefore, if the bettor wagers on the "banker" hand and the "banker" hand wins, the bettor must pay to the gaming establishment a commission, typically about 5% of the amount the bettor wins. No commission is paid if the bettor successfully wagers on the "player" hand.

The manner of play of baccarat is as follows: a multiple number of decks of standard playing cards, 52 in number, are used, typically eight decks are shuffled together and placed in a shoe box from which the cards are dealt during the play of the game. Each player makes a wager on whether the "banker" hand will win, the "player" hand will win, or a tie will occur. Once all wagers are made, two cards are dealt from the shoe box to the "player" hand and two cards are dealt to the "banker" hand in alternate fashion. The cards are turned face-up, the values of the "player" hand and the "banker" hand are summed, and the unit digit is determined to be the hand value. Aces count as one, faces and tens count as zero and the other cards count their respective value. For example, a seven, an eight and a queen total fifteen, so the hand value is determined to be five.

The highest hand value in baccarat is nine, and all hand values range from zero to nine. If a set of predetermined "player" criteria are met, a third card will be dealt to the player, and similarly for the "banker", although the criteria are not identical for the "player" and for the "banker". The value of this third card is added to the total of the first two cards and a new hand value is established. Again, if the new hand total exceeds nine, the hand value is determined by subtracting ten from the total hand. The rules for determining whether a third card is dealt are fixed, there is no discretion for either the "player" hand or the "banker" hand on whether a third card is dealt. Prior to drawing, each player can place their wagers on "player", "banker", or tie. Whichever of the player hand or banker hand is nearest to nine is the winner, and if the hands are equal, it is a tie.

Live Baccarat is offered to players who wish to feel the thrill and excitement of a live game, although they are not personally present in a gaming room.

An online live game comprises a real gaming facility such as a casino or a gaming room, wherein the game is played by a manager, such as a human dealer, and captured by a capturing device such as a video camera. Multiple online players, each using a computer view the online game via a display device such as a monitor of the computer displaying the captured game, and participate in the game by using input devices such as a keyboard, a mouse, a touch screen or another pointing device or mechanism. However, even when a player views and participates in an online game, the thrill and excitement of personally participating in a baccarat game in a real gaming room is still missing. Also missing is a way for the gaming room operator to reward or encourage a certain player.

There is therefore a need in the art for a method and apparatus that will provide an online Baccarat player participating in a remote game with enhanced excitement and added benefits, in order to make him feel as if he was personally present in a gaming room.

SUMMARY OF THE PRESENT INVENTION

It is an object of the present invention to provide a novel method and apparatus for providing the thrill and excitement of a real gaming room to online players. Some of the thrill is provided by letting the highest-betting players to get a preview of a drawn card, before the other players get a chance to view the card.

In accordance with the disclosed invention there is thus provided an apparatus for participating from a remote location in a card game, the apparatus comprising: a gaming facility connected to a network, the gaming facility comprising: a game manager for drawing one or more cards according to a predetermined rule associated with the card game and one or more capturing devices for capturing an image stream of the game manager; and a server connected to the network for broadcasting the image stream of the game manager, and an image stream showing the card drawn by the game manager being gradually revealed; and a computing platform, the computing platform connected to the network, the computing platform provisioned with a display, the display showing to a player at least: the image stream of the game manager; and the image stream of the card being gradually revealed. The card game is optionally a Baccarat game. Within the apparatus, the first capturing device optionally generates an image stream of a person gradually revealing the card. The gaming facility optionally comprises a second capturing device for generating an image stream of a person gradually revealing the card. Within the apparatus, the first capturing device optionally generates an image stream of a card being gradually revealed. The gaming facility optionally comprises a second capturing device for generating an image stream of a card being gradually revealed. The gaming facility optionally comprises a second capturing device for generating a first image stream showing a first person gradually revealing an at least one first card, and a second image stream showing a second person gradually revealing an at least one second card. Within the apparatus, the image stream showing the card drawn by the game manager being gradually revealed is optionally pre recorded or graphically generated. The apparatus optionally comprises one or more controls for the player to show at least a predetermined part of the card being gradually revealed. The image stream showing the card drawn by the game manager being gradually revealed is optionally shown during a predetermined duration. The display optionally provides the player with one or more controls for providing one or more instructions related to gradually revealing the card. The instruction is optionally selected from the group consisting of: reveal about a half of the card, reveal about a third of the card, rotate the card in about ninety degrees, or toss the card.

Another aspect of the disclosed invention relates to a method for playing an online card game from a remote location in, the method comprising: a drawing step for drawing one or more cards from a deck of cards; a displaying step for displaying to a first player using a first computing platform, an image stream showing a part of the card being gradually revealed; and a tossing step for showing the card to a second player. The method can further comprise a squeezing step for: gradually revealing the card to a capturing device; and generating the image stream of the card being gradually revealed. Within the method, gradually revealing the card to the capturing device is performed by a person. Within the method, generating the image stream of the card being gradually revealed is optionally performed by a video camera, or by a scanner and a computing platform. The method optionally comprises a preparation step for preparing an image stream of a card being gradually revealed. The method can further comprise a step of sending the image stream showing the card being gradually revealed, to a second computing platform. Within the method, the first player optionally provides instructions on how the card should be gradually revealed. The instructions optionally include an indication to the part or the orientation of the card being gradually revealed. The method, wherein the first player placed a bet higher then a bet placed by a second player, or higher than a predetermined threshold.

BRIEF DESCRIPTION OF THE DRAWINGS

Non-limiting embodiments of the invention will be described with reference to the following description of exemplary embodiments, in conjunction with the figures. The figures are generally not shown to scale and any sizes are only meant to be exemplary and not necessarily limiting. In the figures, identical structures, elements or parts that appear in more than one figure are preferably labeled with a same or similar number in all the figures in which they appear, in which.

DETAILED DESCRIPTION OF THE PREFERRED EMBODIMENT

Figure 1:
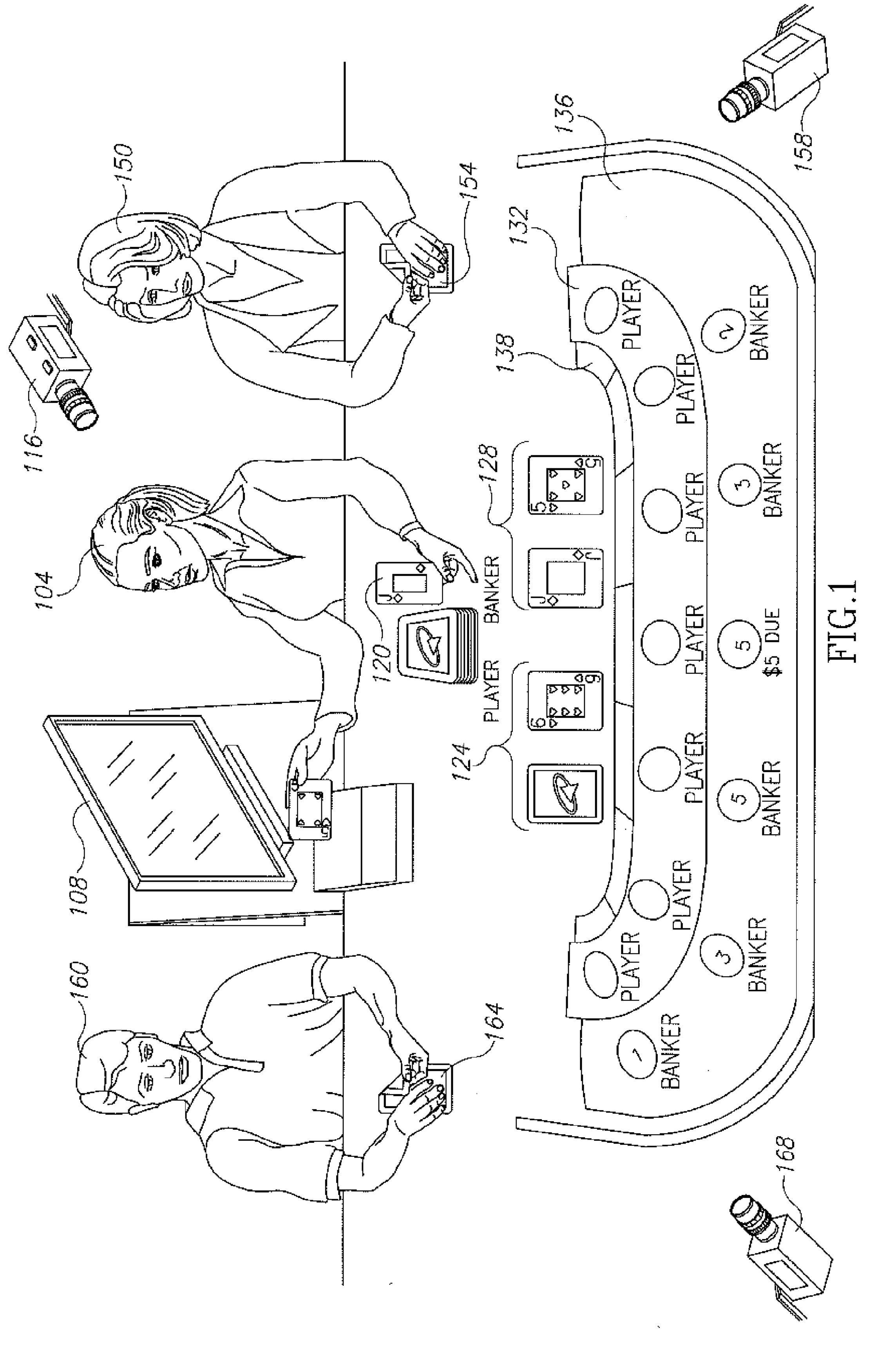
FIG. 1 is a schematic illustration of a gaming facility, in accordance with a preferred embodiment of the disclosed invention.

The present invention overcomes the disadvantages of the prior art by providing a novel solution which enhances and adds to the capabilities of currently available live baccarat games offered to people participating online in a game from a remote location.

In the description that follows, the term player relates to a person participating in the game, optionally from a remote location. The term "player" relates to a side in the game of Baccarat, as opposed to "banker".

In a preferred embodiment of the disclosed invention, a baccarat game is taking place in a gaming facility such as a casino, a gaming room or any other location. A game manager, such as dealer plays the game, by drawing cards according to the rules of the game. The game is captured by a capturing device such as a video camera which generates an image stream of the game manager and the game table. The image stream is sent from the capturing device to a server, and then broadcast by the server to one or more remote online players. The capturing device or a computing platform the capturing device is connected to, the server and the remote players are connected by a network, such as the internet. The remote players preferably use a computing platform provisioned with a display, such as a computer, a handheld device or the like. Each player views the online game, possibly hears voices captured in the gaming room, and actively participates in the game or places his bets through a user interface by using input devices such as keyboard, mouse or the like. The player's input is sent to the server and possibly to the gaming facility. A remote online gaming environment is described in U.S. Pat. No. 5,800,268 granted to Molnick, incorporated herein by reference.

In Baccarat games played in gaming rooms, it is customary to let the player who bet the highest sum on the "banker" or the player who bet the highest sum on the "player", an option to view their respective cards before the other players get to see them. When the option is available, the dealer, a dedicated representative, or two dedicated representatives, one for the "banker" and one for the "player" gradually reveal the dealt card and slowly show its face to the relevant player, i.e. the player who bet the highest sum for that party. The gradually revealing may be called "squeezing" the card. The full card, half of the card, a third of the card or any other part can be shown to the player. The player can choose whether the card will be squeezed along its wide or along its narrow side. In a preferred embodiment, while squeezing takes place, the corners of the card are hidden by the representative's thumbs, so that the card numeric value is not seen.

In order for an online player to feel the thrill of being physically present in a gaming room, the squeezing option is also enabled to remote online players participating in the game. Similarly to a real game, the option is enabled to the players who placed the highest bet on the "banker" or on the "player" side. In a preferred embodiment, the gaming room or the site at which the game takes place, has two representatives, one for the "banker" and one for the "player", which squeeze the cards and show them to a capturing device. The captured stream is preferably shown only to the highest betting players of the relevant party. In a preferred embodiment the player is limited in the time the overall squeezing time for a particular card, after which the card is tossed. Preferably, the player is also limited in the time each squeezing takes, after which the user can issue another squeezing command if the overall squeezing time is not finished, or the card is tossed.

Referring now to FIG. 1, showing a preferred embodiment of the disclosed invention. FIG. 1 shows the environment in which the actual live game takes place, generally referenced 100. Dealer 104 draws from a deck of cards or multiple decks 120 two cards 124 for the "player" and two cards 128 for the "banker". If a set of "player" criteria are met, the dealer draws a third card for the "player". If a set of "banker" criteria is met, the dealer draws a third card for the "banker". Dealer 104 passes each drawn card through scanner 112, which identifies the scanned card, i.e. determines its number and type. Bets placed by the players are indicated by coins placed on "player" area 132, on "banker" area 136, or on "tie" area 138. Dealer 104 communicates with the players through a computing platform (not shown) having input devices such as a keyboard, a mouse or another pointing device (not shown), and optionally receives indications from the remote players on display 108. The scene is captured by capturing device 116, such as a video camera, an IP camera or any other capturing device connected to a network, so that its captured stream can be broadcast. Capturing device 116 optionally captures also the voices at environment 100. In a preferred embodiment of the disclosed invention, representative 150 is the “player” representative, who squeezes the cards for the player that placed the highest bet on the “player”, and representative 160 is the “banker” representative, which squeezes the cards for the player that placed the highest bet on the “banker”. When a card is to be squeezed for the player who placed the highest bet on “player”, “player” representative 150 squeezes card 154 which was drawn by dealer 104 by showing the card as it is being squeezed to capturing device 158, which is preferably a video camera, an IP camera or another capturing device connected to a network. Similarly “banker” representative 160 squeezes card 164 and shows it to capturing device 168 when the card is to be shown to the player that placed the highest bet on the “banker”. The video stream of the squeezed card is broadcast only to the player who placed the highest bet on the respective side, unlike the stream captured by capturing device 116 which is transmitted to all players. In yet another alternative, the squeezing option is enabled also for other players, such as players who placed a bet higher than a predetermined threshold, or players that agree to pay an extra fee. It will be appreciated that since the cards are drawn one at a time, capturing device 158 and capturing device 168 can be the same capturing device. Similarly, “player” representative 150 and “banker” representative 160 can be the same person. Alternatively, “player” representative 150 or “banker” representative 160 can be the game manager.

Figure 2:
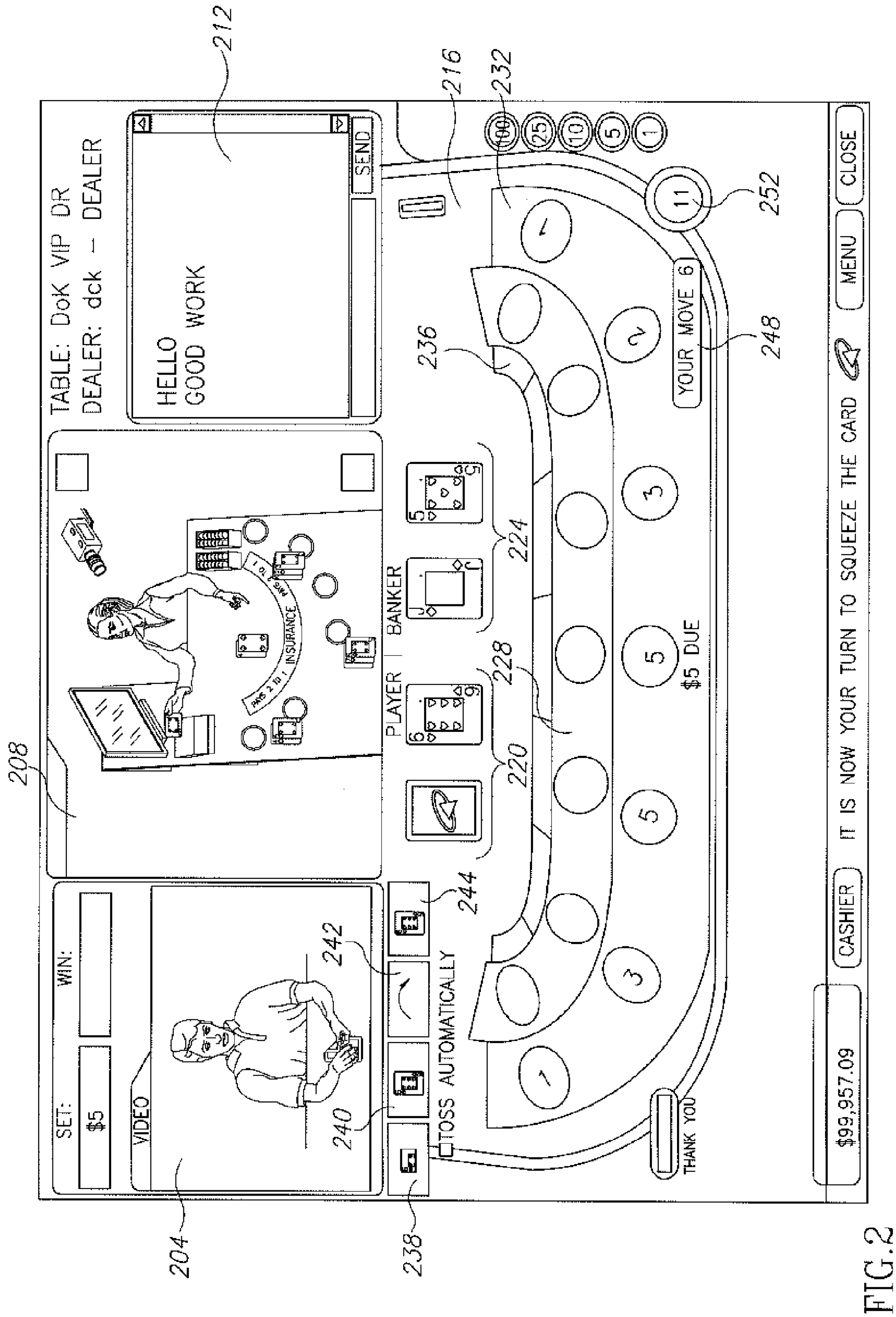
FIG. 2 is an illustration of a screen of an online remote player, in accordance with the preferred embodiment of the disclosed invention.

Referring now to FIG. 2, showing the screen of a remote player participating in a Baccarat game. The screen, generally referenced 200 comprises a game display pane 208, a communication pane 212, and a game pane 216. The flow of the game is displayed on game pane 216, showing “player” cards 220 when drawn, “banker” cards 224 when drawn, the players’ bets placed on the “banker” 228, the players’ bets placed on the “player” 232, the players’ bets placed on tie area 236, and activation buttons, including bet buttons 236. Game display pane 208 shows the stream captured by capturing device 116 of FIG. 1, and communication pane 212 enables the player to with dealer 104 of FIG. 1. In addition, the players who placed the highest bets on the “player” or on the “banker” are displayed with an exclusive close-up video feed of the respective card being squeezed in squeezing display pane 204, and a set of squeezing controls 238, 240, 242 and 244. Squeezing display pane 204 shows to the player who placed the highest bet on the “player” or on the “banker”, the squeezing of each card of the party he placed his bet on, as captured by capturing device 158 or 168 of FIG. 1, respectively. Display pane 204 can show just the card being squeezed, or the representative squeezing the card together with the card itself. The remote player can use action controls 238, 240, 242 and 244, such as buttons, touch sensitive screen areas or the like to indicate the actions related to squeezing the cards, required from representative 150 or 160. Alternatively, the indications can be extracted by speech recognition or word spotting techniques from words or fluent speech spoken by the player, and transmitted to the representative. In yet another alternative, the player’s voice will be transferred over IP (VoIP), a regular telephone, cellular telephone or the like to the representative. If the user clicks or otherwise indicates full squeeze button 238, or an associated command, the representative will squeeze the card until half of the card is shown. If the player indicates half squeeze button 240 or associated command, the representative will squeeze the card until a third of the card is shown; if the user indicates on rotate button 242 or associated command the representative will rotate the card in about ninety degrees from its current orientation; and when the user indicates toss button 244 or associated command, the representative will open the card so that all players can see it and it is tossed to the dealer face-up. The orientation (i.e. horizontal or vertical) in which the card is squeezed depends on its initial drawing orientation, and on whether the highest betting player clicked on rotate button 242. Window 204 and controls 238, 240, 242 and 244 are optionally presented automatically to a player who placed the highest bet on either side. Additionally toss automatically checkbox 245 enables a player to skip the squeezing although he or she placed the highest bet on a certain party. Window 204 and controls 238, 240, 242 and 244 are shown only if checkbox 245 is not checked. In yet another alternative, the option is enabled also for other players, such as players who placed a bet higher than a predetermined threshold, or players that agree to pay an extra fee. The player having the privilege of seeing the squeezed cards has an additional display of a single action timer 248 and overall timer 252. When squeezing is enabled for a particular player, when the player presses any of buttons 238, 240, 242 or 244, an appropriate indication is sent to the gaming room, the representative see the indication on display 108 of FIG. 1, are instructed by the game manager, or see the indication on a separate display and act accordingly. Alternatively, if the squeezing stream shown to the players is pre recorded, a relevant stream is selected, for example a stream showing half or full exposure of the card, a card being squeezed horizontally or vertically, or the like. The squeezing occurs according to the option selected using buttons 238, 240, 242 or 244 until the player asks to toss the card, or until a time limitation is met, and the card is tossed. Single action timer 248 is preferably restarted every time the player indicates a command such as by clicking on button 238, 240, 242 or 244, and counts down from a predetermined duration, such as between about 2 seconds and about 120 seconds. Overall timer is 252 preferably restarted and starts counting down whenever the player who can squeeze is dealt a new card that can be squeezed (this option is traditionally available only for the second or the third player or banker cards, although it can also be enabled for the first cards as well). If either single action timer 248 or overall timer 252 counted down to zero, the card is tossed. Until then, the player can choose options such as by clicking buttons 238, 240, 242 or 244. If overall timer 252 counted down to zero, the card is tossed and no more squeezing is enabled for the current card, while if single action timer 248 counted down to zero the player must click or indicate another command button, otherwise the card is tossed.

In an alternative embodiment, when representatives are not present on the gaming site, the cards are shown to the highest betting players by a computerized mechanism. For example, the step at which the dealer passes a card through a scanner in order to later present the card or a computerized version thereof to all players can be used. The passing of the card or a part thereof in the scanner can be captured and presented in the required pace to a user. Alternatively, once a card is determined after it was scanned by a scanner, a pre-captured image stream showing the squeezing of the same card is presented to the user. Alternatively, a graphically generated, such as a computer-generated stream showing the card being squeezed, rather than a capturing of a human squeezing a card is presented to the player. In yet another preferred embodiment the stream is sent to another destination, such as a handheld device associated with the player, an e-mail address or the like.

Figure 3:
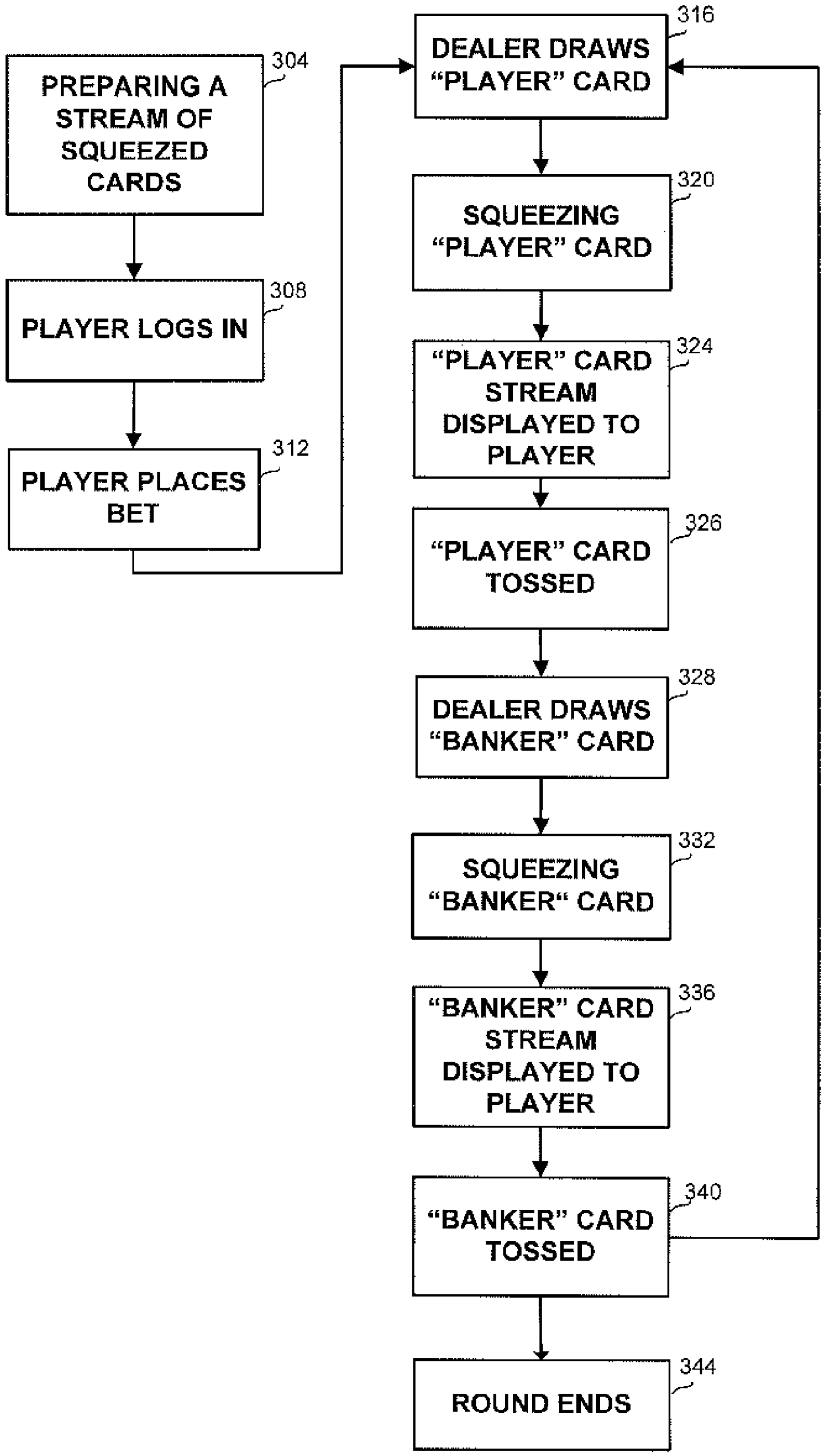
FIG. 3 is a flowchart of the main steps of the method of the disclosed invention.

Referring now to FIG. 3, showing a flowchart of the main steps in a method for online Baccarat in accordance with the disclosed invention. At optional step 304, streams describing half or third exposure of each card are prepared. The streams can be prepared by capturing a person squeezing the cards, or by preparing a computerized illustration of the cards being squeezed. Step 304 is optional and can be skipped, if the squeezed cards are captured in real time or near real time as detailed below. At step 308 one or more players login to the system in order to play one or more rounds of Baccarat. At step 312 one or more of the players that logged into the game place their bets, on the "player" side, on the "banker" side, or on tie. At drawing step 316 the dealer draws a card for the "player" side, from a deck of cards. At optional squeezing step 320 the "player" representative squeezes the card, i.e. gradually reveals the card or a part thereof according to the player's choices as selected using buttons 238, 240, 242, 244 or 245 of FIG. 2. The representative gradually reveals the card to a capturing device, which outputs the image stream to be shown to the player that placed the highest bet, or met other criteria. Alternatively, the image stream is generated by the card being shown to a device such as a scanner which scans the card, and a computing platform such as a computer that generates an image stream of the card being gradually revealed. Step 320 is optional since it can be omitted if the streams were prepared at step 304 detailed above. At display step 324 the squeezed "player" card is displayed to the player that placed the highest bet on the "player" side. If step 320 is performed, the squeezed card is preferably shown to the user in real-time or near-real time relatively to step 320. The squeezed card is optionally sent to a second computing device, such as a handheld device of the user or the like. At step 326 the "player" card is tossed on the table, so all players can see it. The sequence repeats in step 328, 332, 336 and 340 for the "banker" side. Steps 316, 320, 324, 326, 328, 332, 336 and 340 are preferably performed for the second card drawn for the "player" and for the "banker", and not for the first card. If a third card is drawn for the "player", steps 316, 320, 324 and 326 are repeated, and if a third card is drawn for the "banker", steps 328, 332, 336 and 340 are repeated. The steps can be performed also for the first card, if the operator wishes to enable this option. At step 344 the round ends, the players' and the house's accounts are debited or credited, and a new round possibly begins at step 312.

It will be appreciated by a person skilled in the art that the disclosed gaming scene and the disclosed user interface are exemplary only, and that different settings or different user interfaces can be used without departing from the spirit of the current invention. It will also be appreciated that the disclosed invention can be used for any card game in which gradually revealing is desired by one or more players, and is not limited to a Baccarat game.

The present invention has been described using non-limiting detailed descriptions of embodiments thereof that are provided by way of example and are not intended to limit the scope of the invention. It should be understood that features described with respect to one embodiment may be used with other embodiments and that not all embodiments of the invention have all of the features shown in a particular figure or described with respect to one of the embodiments. It is noted that some of the above described embodiments may describe the best mode contemplated by the inventors and therefore include structure, acts or details of structures and acts that may not be essential to the invention and which are described as examples.

The present invention is not limited to what has been particularly shown and described hereinabove. Structure and acts described herein are replaceable by equivalents, which perform the same function, even if the structure or acts are different, as known in the art. The scope of the present invention is defined only by the claims which follow. When used in the following claims, the terms "comprise", "include", "have" and their conjugates mean "including but not limited to".

The invention claimed is:

1. A computerized gaming system enabling participation of one or more players in a card game from one or more locations other than a location of a game scene, the system comprising:

at least one capturing device operatively coupled to a server, wherein the capturing device is operable to transmit to the server at least a first image stream, said first image stream representative of the game scene;

wherein the server is operable to transmit said first image stream to destination devices associated with all of said one or more players; and wherein the server is further operable to transmit one or more second image streams representative of a gradually revealed card, the server is operable to transmit said one or more second image streams only to destination devices associated with one or more players placed the highest bets, wherein the server is further operable to enable individual configuring any of the one or more second image streams before transmitting to a given destination device, such configuring provided in accordance with one or more instructions related to presenting the gradually revealed card and received from a player associated with the given device, wherein only the one or more players placed the highest bets are enabled to provide the one or more instructions, and wherein at least one of said one or more instructions are selected from a group comprising instructions related to orientation of gradually revealing the at least one card and instructions related to a part of the at least one card to be gradually revealed.

2. The system of claim 1, wherein the second image stream is a live image stream captured by the at least one capturing device.

3. The system of claim 1, wherein the server is configured to accommodate one or more pre-recorded image streams, and a second image stream of the one or more second image streams to be transmitted to a given destination device is selected from the one or more pre-recorded image streams in accordance with one or more instructions provided by a respective player associated with the given device, thereby providing individual configuration of the second image stream to be transmitted to the given device.

4. The system of claim 3, wherein the selection of the second image stream to be transmitted to a certain player is provided responsive to the one or more instructions received from said certain player.

5. The system of claim 1, wherein the server is configured to transmit the second image stream together with the first image stream when transmitting to a destination device associated with a player that placed the highest bet.

6. The system of claim 1, wherein the server is configured to transmit the first image stream and the second image stream to different destination devices both associated with a player that placed the highest bet.

7. The system of claim 1, wherein the server is further configured to enable concurrent displaying of the first image stream and the second image stream at a destination device associated with a player that placed the highest bet.

8. A server operable in conjunction with a computerized gaming system enabling participation of one or more players in a card game from one or more locations other than a location of a game scene, the server operable to:

receive a first image stream, said first image stream representative of the game scene and transmit one or more second image streams representative of a gradually revealed card, wherein the server is operable to transmit the one or more second image streams only to destination devices associated with one or more players placed the highest bets, the server is further operable to enable individual configuring any of the one or more second image streams before transmitting to a given destination device, such configuring provided in accordance with one or more instructions received from a player associated with the given device and related to presenting the gradually revealed card, wherein only the one or more players placed the highest bets are enabled to provide the one or more instructions, wherein at least one of said one or more instructions are selected from a group comprising instructions related to orientation of gradually revealing the at least one card and instructions related to a part of the at least one card to be gradually revealed.

9. The server of claim 8, wherein the second image stream is a live image stream captured by a capturing device at the game scene.

10. The server of claim 8, wherein the server is configured to accommodate one or more pre-recorded image streams, and a second image stream of the one or more second image streams to be transmitted to a given destination device is selected from the one or more pre-recorded image streams in accordance with one or more instructions provided by a player associated with the given device, thereby providing individual configuring the second image stream to be transmitted to the given device.

11. The server of claim 10, wherein the selection of the second image stream to be transmitted to a certain player is provided responsive to the one or more instructions received from said certain player.

12. The server of claim 8, further configured to transmit the second image stream together with the first image stream when transmitting to a destination device associated with a player that placed the highest bet.

13. The server of claim 8, further configured to transmit the first image stream and the second image stream to different destination devices both associated with a player that placed the highest bet.

14. The server of claim 8, wherein the server is configured to:

enable concurrent displaying of the first image stream and the second image stream at a display device associated with a player that placed the highest bet.

15. A method of operating a computerized gaming system in a manner enabling participation of one or more players in a card game from a location other than a location of a game scene, the method comprising:

capturing by a capturing device at least a first image stream, said image stream representative of the game scene;

transmitting said first image stream to a server, and further transmitting said image stream from the server to destination devices associated with all of said one or more players; individually configuring at said server one or more second image streams representative of a gradually revealed card and to be transmitted to respective destination devices; and transmitting from said server one or more individually configured second image streams, wherein said second image streams are transmitted only to destination devices associated with the one or more players placed the highest bets, wherein configuring any of the one or more second image streams is provided in accordance with one or more instructions related to presenting the gradually revealed card and received from a player associated with a respective destination device, and wherein only a player out of one or more players placed the highest bets is enabled to provide the one or more instructions, and wherein at least one of said one or more instructions are selected from a group comprising instructions related to orientation of gradually revealing the at least one card and instructions related to a part of the at least one card to be gradually revealed.

16. The method of claim 15 further comprising:

capturing the second image stream at the game scene.

17. The method of claim 15, further comprising:

selecting, before transmitting, a second image stream of the one or more second image streams to be transmitted to a given destination device from one or more pre-recorded second image streams accommodated in the server, selecting provided in accordance with one or more instructions provided by a player associated with the given device, thereby providing individual configuration of the second image stream to be transmitted to the given device.

18. The method of claim 17, wherein at least one pre-recorded second image stream is selected from a group comprising pre-captured image streams and graphically generated image streams.

19. The method of claim 17, wherein selecting the second image stream to be transmitted to a certain player is provided responsive to one or more instructions received from said certain player.

20. The method of claim 15, wherein, when transmitted to a destination device associated with a player that placed the highest bet, the first image stream is transmitted together with the second image stream.

21. The method of claim 15, wherein the second image stream is transmitted separately from the first image stream.

22. The method of claim 15, wherein the first image stream and the second image stream are transmitted to different destination devices both associated with a player that placed the highest bet.

23. The method of claim 15, further comprising enabling concurrent displaying of the first image stream and the second image stream at one or more destination devices associated with said one or more players that placed the highest bets.

* * * * *